United States Patent [19]

Maltby

[11] 4,285,467

[45] Aug. 25, 1981

[54] THREE-PORT THERMALLY RESPONSIVE VALVE

[75] Inventor: Edgar W. Maltby, Elgin, Ill.

[73] Assignee: Eaton Corporation, Cleveland, Ohio

[21] Appl. No.: 53,675

[22] Filed: Jul. 2, 1979

Related U.S. Application Data

[63] Continuation of Ser. No. 841,422, Oct. 12, 1977, abandoned.

[51] Int. Cl.³ .............................................. G05D 23/12
[52] U.S. Cl. ..................................... 236/86; 236/100; 236/101 A
[58] Field of Search .............. 236/86, 87, 101 C, 100, 236/101 A, 99 K; 137/846; 625.27; 123/117 A

[56] References Cited

U.S. PATENT DOCUMENTS

| | | | |
|---|---|---|---|
| 3,383,041 | 5/1968 | Stratynski | 236/86 |
| 3,664,774 | 5/1972 | Tupper et al. | 137/846 X |
| 3,756,083 | 9/1973 | Tatsutomi et al. | 60/527 X |
| 3,789,811 | 2/1974 | Franz et al. | 123/117 A |
| 3,841,551 | 10/1974 | Ota | 236/100 X |
| 3,951,166 | 4/1976 | Whitener | 137/625.27 |
| 3,960,124 | 6/1976 | Payne | 123/117 A |
| 3,960,321 | 6/1976 | Steele, Jr. | 236/100 |

Primary Examiner—William E. Tapolcai, Jr.
Attorney, Agent, or Firm—R. J. McCloskey; R. A. Johnston

[57] ABSTRACT

A three-port thermally responsive valve for alternately valving an intermediate fluid port with adjacent upper and lower fluid ports. A single valve member is movably contained within a housing fluid passageway and spring-biased in a first position so that a sealing surface at each end of the valve member is respectively engageable with and spaced from corresponding valve sealing surfaces in the fluid passageway. The sealing surfaces on the valve member are spaced with respect to the valve sealing surfaces in the housing fluid passageway to maintain isolation of the upper and lower fluid ports until valving of the intermediate fluid port with either the upper or lower fluid port is completed. When predetermined temperatures are encountered, a thermally responsive actuator connected to the valve member by a rod overcomes the biasing force generated by the spring and moves the valve member to the second valved position.

17 Claims, 5 Drawing Figures

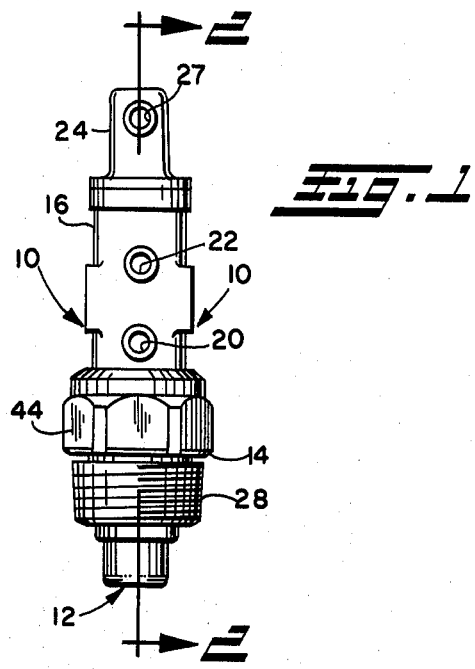
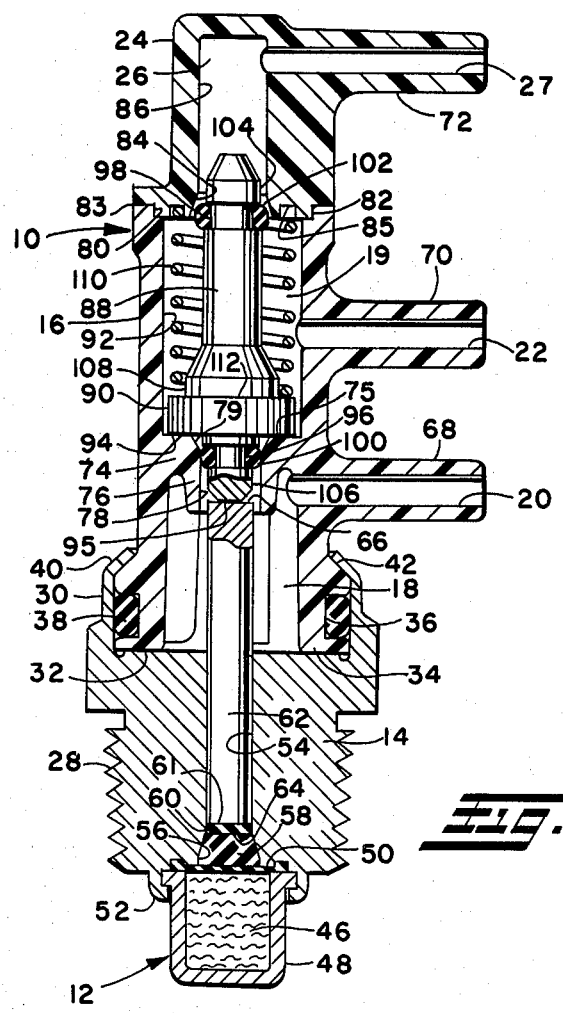
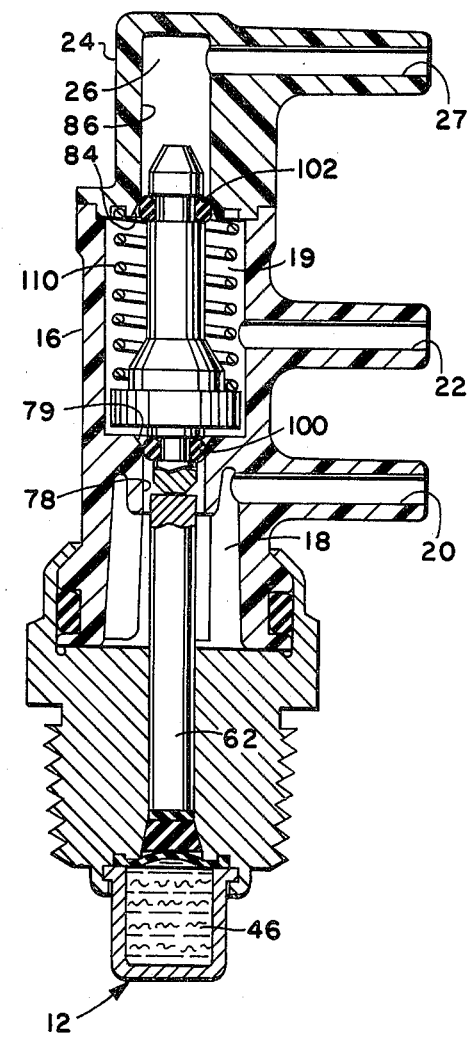

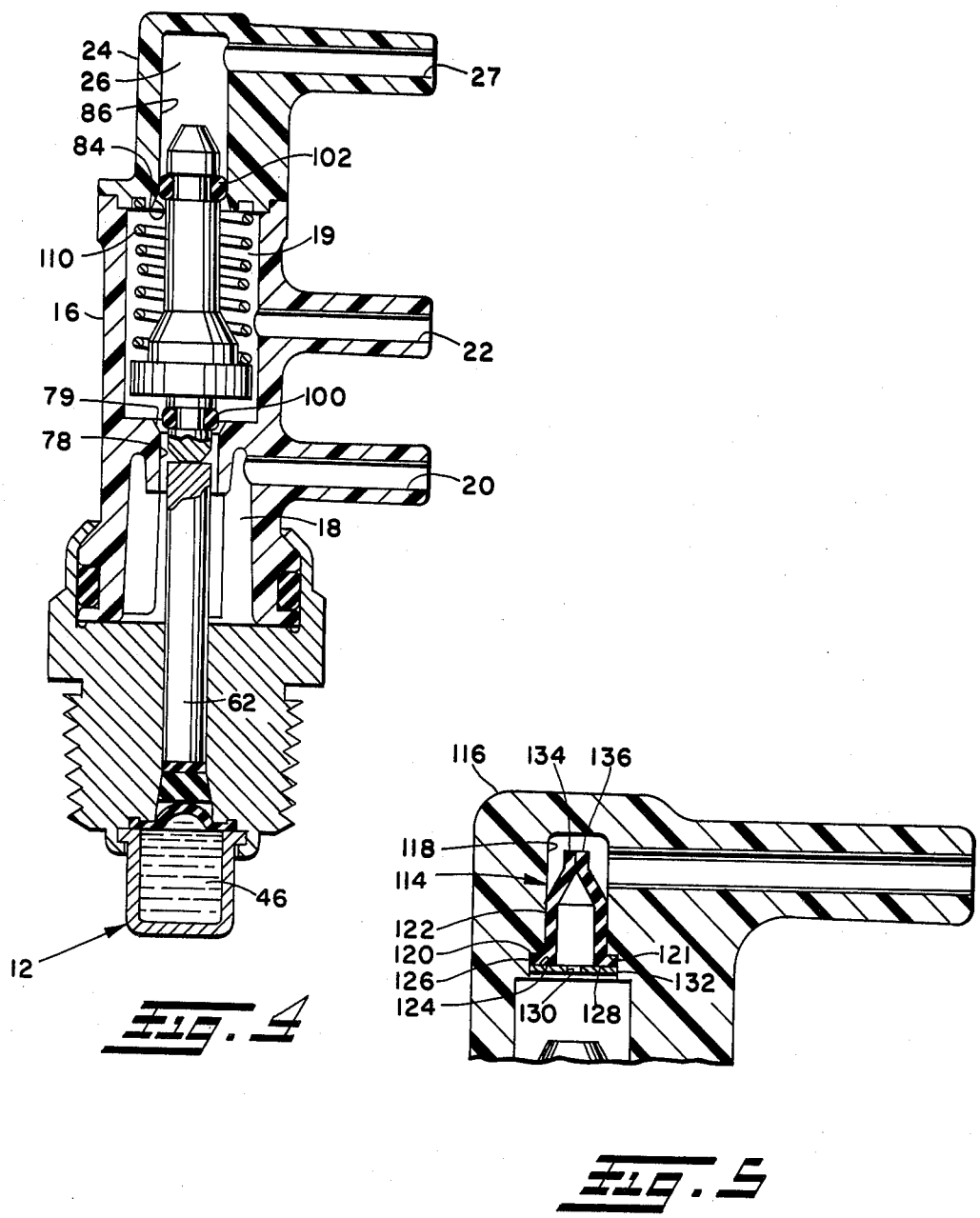

THREE-PORT THERMALLY RESPONSIVE VALVE

This is a continuation of application Ser. No. 841,422, filed Oct. 12, 1977, now abandoned.

BACKGROUND OF THE INVENTION

Engine performance immediately after start-up can be improved by diverting exhaust gases from the exhaust manifold to an area around the carburetor for heating the intake air, thus permitting improved vaporization of the fuel-air mixture. It has been a common practice to utilize a three-port valve for valving an intake manifold vacuum source to a vacuum motor which opens a heat valve enabling exhaust gas heat to be transferred to the carburetor. As the engine continues to operate, the exhaust gas temperature approaches a level which can result in excessive heating of the incoming air to the carburetor leading to vapor lock. Before this point is reached, the three-way valve shuts off the vacuum motor by isolating the vacuum source and valving the motor to a venting port. Prior art devices in common use for performing these valving functions include the standard three-port spring biased ball-type valve. Valve chatter is a problem encountered with ball-type three port valves. During valving of the vacuum motor port between the vacuum source and the venting source, there is a point at which the vacuum source is fluidly connected to the venting port resulting in a sudden pressure build-up around the valve ball which tends to lift the ball off its seat until overcome by the return spring. As the spring returns to its normal position, the fluid pressure again lifts the ball off its seat setting up the chattering effect until the ball seals off the vacuum source. A further problem associated with the use of a standard three-port valve is that it has been necessary to utilize an independently mounted check valve located between the vacuum port of the three-way valve and the vacuum source in order to isolate the vacuum motor from fluctuations in the vacuum source caused by sudden vehicle accelerations. A separately mounted check valve increases the total unit manufacturing costs plus adds to installation costs.

SUMMARY OF THE INVENTION

In the present invention valve chatter encountered during operation of a ball check type valve has been eliminated by utilizing a unique arrangement of valve seal and sealing surface spacing which permits the vacuum source to be isolated from the vacuum motor port before venting. With the vacuum source isolated from the venting port, the sudden flow of fluid from the venting port no longer reacts against the valve member to overcome the action of the retaining spring resulting in chatter of the valve member. This sealing arrangement also permits a more precise valve action to occur. Another advantage achieved by the present invention is that a check valve member can be mounted directly within the valve body, thus eliminating the need for a separate check valve mounted exteriorly with respect to the three-port valve member, thus providing a more compact assembly in which manufacturing and installation costs are significantly reduced from previously employed devices.

BRIEF DESCRIPTION OF THE DRAWINGS

FIG. 1 is a plan view of the assembly of the device of the present invention;

FIG. 2 is a cross-sectional view of a first embodiment of the invention taken along section indicating lines 2—2 of FIG. 1 and illustrates the valve in the first position wherein the thermal element senses temperatures below a predetermined level;

FIG. 3 is a cross-sectional view similar to FIG. 2 illustrating the valve in an intermediate position during which the valve member is moving upward;

FIG. 4 is a cross-sectional view similar to FIG. 2 illustrating the valve in the second position with the thermal element sensing temperatures at or above a predetermined level;

FIG. 5 is a partial cross-sectional view of a second embodiment of the invention similar to FIG. 2.

DETAILED DESCRIPTION

Referring to FIG. 1 and FIG. 2, a thermally responsive vacuum valve indicated generally by numeral 10 is shown having a thermally responsive actuator indicated generally by numeral 12 extending from an adapter 14. A lower housing section 16 defining fluid chamber portions 18 and 19 is provided which includes first and second spaced fluid ports 20 and 22, preferably vertically aligned. An upper housing section 24 defining a fluid chamber portion 26 is provided and has formed therein a third fluid port 27 which is also preferably aligned with ports 18 and 20. In the presently preferred practice, upper housing 24 and lower housing 16 are preferably injection molded from a suitable plastic material, such as a glass filled nylon, and are joined together along a transverse parting line to be hereinafter described, and sealed against fluid leakage by any suitable means as, for example, a sonic welding process. However, other materials and manufacturing techniques may be used to fabricate and seal the housing sections without departing from the present invention.

The adapter 14 has a tapered pipe thread 28 at one end and is attached to the bottom end of lower housing section 16 which permits assembly of the valve to the apparatus from which a medium is to be sensed as, for example, on an engine for sensing the temperature of the engine coolant. The housing sections are free to rotate as a unit with respect to the adapter 14 thereby permitting alignment of the fluid ports after installation to any desired position.

A relatively thin wall tubular projection 30 is formed in the upper end of the adapter 14 and has located and received therein the lower end 32 of lower housing section 16. End 32 of lower housing section 16 has a thickened cylindrical wall portion 34 with an annular groove 36 formed therein in which is received a seal ring 38. Seal ring 38 provides a dynamic seal between the adapter 14 and lower housing section 16. An upper portion 40 of tubular projection 30 has a wall thickness suitable for crimping. A tapered surface 42 is provided on lower housing section 16. Upper portion 40 is crimped over surface 42 a sufficient amount to locate and retain the lower housing in the adapter, but still allow relative rotation therebetween at a breakaway torque from about 10 to 30 inch-pounds, but preferably not exceeding 50 inch-pounds. The upper exterior surface of adapter 14 is provided with a hexagonal pattern of wrench flats, typically indicated by numeral 44, to facilitate valve installation.

Referring now particularly to FIG. 2, a volumetrically thermally responsive material 46 is provided which may be of any suitable type well known in the art as, for example, a mixture of wax and copper metallic flakes, is disposed within a retaining cup 48 which is preferably formed from mild steel and attached to the lower extremity of adapter 14. The mixture is enclosed in the cup by a flexible cover in the form of a resilient, preferably elastomeric diaphragm 50. A particularly suitable mixture of wax and copper metallic flakes 46 is employed which has an abrupt volumetric change across a predetermined narrow temperature band of approximately 7 to 10 degrees Fahrenheit. The volume increase of the mixture, while passing through this temperature range, is sufficient to result in a movement of the retaining diaphragm 50 of approximately 0.070–0.080 inch. Prior to and after passing through this temperature band, the resultant linear expansion of the mixture is only 0.0003 inch per °F., an amount insufficient to effect the performance of the valve. The wax and copper flake mixture is preferably formulated to provide a volumetric increase in excess of that initially required to actuate the valve in order to compensate for subsequent deterioration of the wax over extended periods of time and exposure to high temperatures which results in reduced volumetric expansion.

A thin wall annular portion 52 formed on the bottom of adapter 14 is deformed over and around a flange provided on the periphery of the retaining cup 48. The retaining cup 48 is preferably held in place by crimping the thin wall portion 52 around the flanged end of the retaining cup. The retaining diaphragm 50 is sealed against the top surface 40 of the retaining cup and the end of the adapter, thus confining the wax mixture 46 therein. The adapter 14 may be fabricated from steel or other suitable material as, for example, brass and has a centrally located bore 54 located therethrough and a tapered counterbore 56 located at the thermal actuator, or lower, end of the adapter. A plug 58 which conforms generally to the space defined by the tapered counterbore 56 is received therein. A disc-shaped spacer 60 having a top surface 61 is slidably received in bore 54 and registers against the upper surface of plug 46. The diaphragm 50, plug 58 and spacer 60 are all formed from a rubber compound which is compatible with the wax-metal flake mixture and suitable for service exposure to the temperatures encountered during operating conditions. A rod 62, preferably fabricated from aluminum, is located within bore 54 with the lower end thereof 64 in contact with spacer 60 and the other end 66 extending upwardly into lower housing section 16. In operation, the expansion of the mixture 32 is transferred through diaphragm 50, plug 58 and spacer 60 causing upward movement of rod 62. This function will be described subsequently in greater detail.

Fluid ports 20 and 22 are formed in tubular projections 68 and 70 which are integrally molded with and extend from lower housing section 16 such that ports 20 and 22 fluidly communicate with fluid chamber portions 18 and 19, respectively. Similarly, fluid port 27 is formed in tubular projection 72 molded integrally with and extending from upper housing section 24; and port 27 fluidly communicates with fluid chamber portion 26. As best shown in FIG. 1, the three fluid ports 20, 22 and 27 are disposed in common alignment along the upper and lower housing sections.

A transverse wall section 74 having an upper transverse surface 75 and a centrally located tubular portion 76 defining a bore 78 axially therethrough with rod 62 extending therethrough is located within housing section 16 and intermediate fluid ports 20 and 22. Bore 78 is also designated as a first valve sealing surface. Clearance is provided between rod 62 and bore 78 sufficient for permitting free fluid flow therethrough. A chamfer or tapered surface 79 is provided along the upper edge of bore 78.

A registering counterbore 80 provided in the upper end of housing section 16 has received and registered therein a diameter 82 formed on and extending from the bottom end of the upper housing 24, thereby locating housing section 24 with section 16. The junction of the lower and upper housing sections forming parting line 83 is later joined by a suitable technique, such as sonic welding.

A chamfered or tapered surface 84 is located intermediate third fluid port 27 and second fluid port 22 and along the inner, lower, edge of housing section 24. An annular groove 85 is provided adjacent and located outward radially from tapered surface 84, opening in an axial direction. Fluid chamber portion 26 defines a bore 86 which is also designated as a second valve sealing surface.

As shown in FIG. 2 an elongated, cylindrically shaped valve member 88 fabricated from a suitable material, preferably aluminum or plastic, is located within the upper and lower housing sections. An enlarged diameter portion 90 is formed near the end of the valve member for locating and centering with respect to an internal diameter 92 formed by fluid chamber portion 19. The radial clearance between diameters 90 and 92 is sufficient to permit free fluid flow therebetween. A lower transverse surface 94 on the valve member 88 abuts with surface 75 of lower housing section 16, thus limiting downward travel of the valve member. A lower end 95 of the valve member is in contact with the upper end 66 of rod 62. Annular grooves 96 and 98 are formed near the lower and upper ends of the valve member, respectively. A seal ring 100 is contained in groove 96 while a seal ring 102 is contained in groove 98, and are designated as first and second seal means, respectively. The upper end of the valve member has a diameter 104 sized to clear internal diameter 86 for permitting free fluid flow therebetween. In a similar manner, the lower end of the valve member has a diameter 106 sized to clear bore 88 for allowing fluid flow therebetween when seal ring 100 is spaced from tapered surface 79.

Tapered surfaces 79 and 84 permit seal rings 100 and 102 to engage with bores 78 and 86, respectively, without damaging the seal rings. The relative spacing of seal rings 100 and 102 with respect to the spacing of tapered surfaces 79 and 84 will be subsequently discussed in greater detail.

A biasing means in the form of a compression spring 110 preferably wound from a chrome-silicon alloy steel is received over a diameter 108 of the valve member and guided thereon. The spring has one end located in annular groove 85 with the other end thereof reacting against a shoulder 112 near the lower end of the valve member for maintaining the valve member in the first position.

Seal rings 38, 100 and 102 are preferably formed from an elastomeric material capable of withstanding continuous exposure to temperatures of 400° to 500° Fahrenheit without degradation.

In operation, as shown in FIG. 2, valve member 88 is biased by spring 110 to the first position, at sensed temperatures less than a predetermined minimum. While in the first position, seal ring 100 is in sealing contact with bore 78 and seal ring 102 is spaced away from bore 86. The gap between the tapered surface 84 and the seal ring 102 allows fluid communication between the second fluid port 22 and third fluid port 27 through fluid chamber portions 26 and 19. In this first position, as shown in FIG. 2, the first fluid port is sealed from the second fluid port by seal ring 100 in sealing contact with bore 78.

It will be understood that rod 50 has a length that spans the distance from the lower end 95 of valve member 88, while in the first position (FIG. 2), to the top surface 61 of spacer 60 without deflecting retaining diaphragm 36 or allowing excessive clearance therebetween. While the valve member is in the above-described first position, the thermally responsive actuator 12 is inactive since the temperatures sensed are below those necessary to cause an abrupt volumetric increase in the wax and metal flake mixture.

Referring now to FIG. 3, the valve member 88 is shown in an intermediate position, between the first and second position, wherein the thermally responsive actuator 12 is sensing a temperature at the value which has resulted in a corresponding abrupt volumetric increase of the wax and copper flake mixture 34. Continued expansion of mixture 32 thereafter overcomes the biasing force of spring 124 and moves rod 62 and valve member 88 upward toward the second position. While valve member 88 is in this intermediate position, the first seal ring 100 remains in sealing engagement with bore 78 in lower housing section 16 and seal ring 102 has engaged with bore 86 in housing section 24. This dual sealing feature permits the second fluid port 22 to be valved from fluid communication with third fluid port 27 to fluid communication with first fluid port 20 without fluid interaction between first fluid port 20 and third fluid port 27. To achieve this result of dual sealing, the spacing between seal rings 100 and 102 must exceed the spacing between bores 78 and 86 so that seal ring 102 sealingly engages with tapered surface 84 and bore 86 before seal ring 100 disengages with tapered surface 79. The effect of this unique spacing arrangement is to eliminate chatter or vibration of the valve member. In a typical application of the present device the third fluid port is connected to a vacuum source on an engine where it is then valved to the second fluid port, making the vacuum source available to a plurality of engine control devices. Heretofore, when the second fluid port required valving to the first fluid port, after a venting port, fluid from the first port would be drawn into the vacuum source, or third fluid port, which tended to lift the valve member off the push rod until overcome by the spring force.

As shown in FIG. 4, the valve member has completed its upward motion and is in the second position with the thermally responsive actuator 12 sensing temperatures above the value which results in an abrupt volumetric increase of the wax and copper flake mixture 46. Valve member 88 has now moved upward by an amount sufficient to space seal ring 100 away from tapered surface 79, permitting fluid communication between fluid port 20 and fluid port 22 through fluid chamber portion 18, bore 78, and fluid chamber portion 19. Seal ring 102, already having sealed against the lower portion of bore 86, is now located further into bore 86 and continues to isolate the third fluid port 27 from the first fluid port 22.

When sensed temperatures are again below the predetermined range, the volume of the mixture 46 will contract permitting the spring 110 to return the valve member to the first position as shown in FIG. 2. The operational sequence occurring during valve movement from the second to the first position is then the reverse of that described above.

There is shown in FIG. 5 a second embodiment of the invention which is otherwise identical to the first embodiment but includes a check valve member (shown generally by numeral 114) and preferably molded from a resilient, high temperature resistant elastomeric material. Upper housing member 116 defines counterbores 118 and 120 and a shoulder 121 in which is received the check valve member 112. The lower end of the check valve comprises a tubular portion 122 having an outer diameter conforming to counterbore 116. A flange 124 having an outer diameter 126 that conforms to the diameter of counterbore 120 is formed around the end of tubular portion 120. A retaining disc 128 having a centrally located hole 130 and a diameter 132 sized for a press fit with respect to counterbore is pressed therein, thereby retaining the check valve member in place. The retaining force generated by disc 128 serves to seal the flange 124 against shoulder 121 preventing fluid leakage around the periphery of the check valve. The upper portion of the check valve converges from a tubular configuration and terminates in a pair of flaps 134 and 136 having the opposed surfaces thereof in sealing contact. In operation, the check valve member permits fluid flow in a direction from the flanged end to the flap end, since a positive internal pressure differential across the flaps overcomes the resilient tendency of the flaps to remain in sealing contact. Fluid flow in the opposite direction is prevented since a positive external pressure differential maintains the flaps in sealing contact. By using the check valve member in combination with the first embodiment of the invention, a constant vacuum supply can be maintained on a vacuum motor (not shown) connected to fluid port 22 (FIG. 2), thus eliminating the need for a separate, individually mounted check valve.

The present invention thus provides a device capable of receiving different vacuum or pressure signals at two spaced ports and alternately valving each to an intermediate fluid port in response to predetermined temperatures by means of a single valve member and a single thermally responsive actuator. The invention provides a unique valving/isolating seal arrangement for valving between the fluid ports while maintaining isolation of the fluid ports during movement of the valve member.

Modifications and variations of the preferred forms of the invention will be apparent to those having ordinary skill in the art without departing from the teachings as hereinabove described, and the invention is limited only by the following claims.

What is claimed is:

1. A thermally responsive device for valving a plurality of fluid ports, comprising:
   (a) a housing means, said housing means defining
      (i) a fluid chamber,
      (ii) first, second and third spaced fluid ports communicating with said fluid chamber,
      (iii) a transversely extending stop surface intermediate said first and second fluid ports;

(iv) a first valve sealing surface integrally formed by said housing means;

(v) a second valve sealing surface integrally formed by said housing means and spaced from said first valve sealing surface;

(b) valve means disposed within said fluid chamber, said valve means including a valve member movable between a first valving position, an intermediate position, and a second valving position, and having first and second spaced seal means thereon, said valve member further including a flanged portion adjacent said first seal means, said flanged portion being engageable with said stop surface, in said first position said first seal means seals against said first valve sealing surface for isolating said first and second fluid ports from each other, said second seal means is spaced from said second valve sealing surface for fluidly communicating said second fluid port with said third fluid port, said flanged portion being in abutment with said stop surface, in said intermediate position said first seal means remains sealed against said first valve sealing surface and said second seal means against said second seal surface for isolating said first fluid port from said second and third fluid ports, and in said second valving position said first seal means is spaced from said first valve sealing surface for fluidly communicating said first fluid port with said second fluid port and said second seal means remains sealed against said second valve sealing surface for isolating said second fluid port from said third fluid port; said flanged portion being spaced from said stop surface in said intermediate and said second positions;

(c) means biasing said valve member to said first position such that said flanged portion abuts said stop surface; and, (d) thermally responsive means associated with said housing means and including means operative to move said valve member between said first and second positions in response to predetermined temperatures.

2. The device as defined in claim 1, wherein, (a) said first valve sealing surface is located intermediate said first and second fluid ports; and (b) said second valve sealing surface is located intermediate said second and third fluid ports.

3. The device as defined in claim 1, wherein said first and second seal means are formed from an elastomeric material.

4. The device as defined in claim 1, wherein said housing means includes a lower housing member having said first and second fluid ports spaced thereon, and an upper housing member having said third fluid port located thereon, said upper and lower housing members being joined in a fluid sealing arrangement along a parting line.

5. The device as defined in claim 1, wherein said upper and lower housing members are formed from a plastic material.

6. The device as defined in claim 1, wherein said upper and lower housing members are sonically welded together at said parting line.

7. The device as defined in claim 1, wherein said first, second and third fluid ports are disposed in a common alignment.

8. The device as defined in claim 1, further comprising a check valve means disposed within said fluid chamber intermediate said valve member and said third fluid port for preventing fluid flow in a direction from said third fluid port to said second fluid port and permitting fluid flow in a direction from said second fluid port to said third fluid port.

9. The device as defined in claim 8, wherein said check valve means includes a resilient tubular member having one end converging and terminating in a pair of flaps, said flaps having opposed surfaces normally in fluid sealing contact with each other, said flaps opening in response to a pressure differential in only one direction to permit fluid flow through said tubular member.

10. A thermally responsive device for valving a plurality of fluid ports, comprising:

(a) housing means, said housing means defining (i) a fluid chamber, (ii) first, second and third spaced fluid ports communicating with said fluid chamber, (iii) a lower housing member having said first and second fluid ports spaced thereon, (iv) an upper housing member having said third fluid port located thereon, (v) a first valve sealing surface integrally formed by said lower housing member;

(vi) a second valve sealing surface integrally formed by said upper housing member;

(vii) said upper and lower housing members being joined in a fluid sealing arrangement along a parting surface located adjacent said second valve sealing surface;

(b) valve means disposed within said fluid chamber, said valve means including a valve member disposed within said fluid chamber, said valve member being movable between a first valving position, an intermediate position, and a second valving position, and having first and second spaced seal means thereon, in said first position said first seal means seals against said first valve sealing surface for isolating said first and second fluid ports from each other, said second seal means is spaced from said second valve sealing surface for fluidly communicating said second fluid port with said third fluid port, in said intermediate position said first seal means remains sealed against said first valve sealing surface and said second seal means seals against said second seal surface for isolating said first fluid port from said second and third fluid poets, and in said second valving position said first seal means is spaced from said first valve sealing surface for fluidly communicating said first fluid port with said second fluid port and said second seal means remains sealed against said second valve sealing surface for isolating said second fluid port from said third fluid port;

(c) means biasing said valve member to said first position; and (d) thermally responsive means associated with said housing means and including means operative to move said valve member between said first and second positions in response to predetermined temperature.

11. The device as defined in claim 10, wherein said upper and lower housing members are formed from a plastic material.

12. The device as defined in claim 10, wherein said upper and lower housing members are sonically welded together at said parting line.

13. The device as defined in claim 10, wherein said first, second and third fluid ports are disposed in a common alignment.

14. The device as defined in claim 10, further comprising a check valve means disposed within said fluid chamber intermediate said valve member and said third fluid port for preventing fluid flow in a direction from said third fluid port to said second fluid port and permitting fluid flow in a direction from said second fluid port to said third fluid port.

15. The device as defined in claim 14, wherein said check valve means includes a resilient tubular member having one end converging and terminating in a pair of flaps, said flaps having opposed surfaces normally in fluid sealing contact with each other, said flaps opening in response to a pressure differential in only one direction to permit fluid flow through said tubular member.

16. A thermally responsive device for valving a plurality of fluid ports, comprising:
  (a) housing means, said housing means defining
    (i) a fluid chamber,
    (ii) first, second and third spaced fluid ports communicating with said fluid chamber,
    (iii) a lower housing member having said first and second fluid ports spaced thereon,
    (iv) an upper housing member having said third fluid port located thereon,
    (v) a first valve sealing surface integrally formed by said lower housing member;
    (vi) a second valve sealing surface integrally formed by said upper housing member;
    (vii) said upper and lower housing members being joined in a fluid sealing arrangement along a parting surface located adjacent said second valve sealing surface;
  (b) valve means disposed within said fluid chamber, said valve means including a valve member disposed within said fluid chamber, said valve member being movable between a first valving position, an intermediate position, and a second valving position, and having first and second spaced seal means thereon, in said first position said first seal means seals against said first valve sealing surface for isolating said first and second fluid ports from each other, said second seal means is spaced from said second valve sealing surface for fluidly communicating said second fluid port with said third fluid port, in said intermediate position said first seal means remains sealed against said first valve sealing surface and said second seal means seals against said second seal surface for isolating said first fluid port from said second and third fluid ports, and in said second valving position said first seal means is spaced from said first valve sealing surface for fluidly communicating said first fluid port with said second fluid port and said second seal means remains sealed against said second valve sealing surface for isolating said second fluid port from said third fluid port;
  (c) means biasing said valve member to said first position;
  (d) thermally responsive means associated with said housing means and including means operative to move said valve member between said first and second positions in response to predetermined temperature; and
  (e) check valve means disposed within said fluid chamber intermediate said valve member and said third fluid port for preventing fluid flow in a direction from said third fluid port to said second fluid port and permitting fluid blow in a direction from said fluid port to said third fluid port.

17. The device as defined in claim 16, wherein said check valve means includes a resilient tubular member having one end converging and terminating in a pair of flaps, said flaps having opposed surfaces normally in fluid sealing contact with each other, said flaps opening in response to a pressure differential in only one direction to permit fluid flow through said tubular member.

* * * * *